US012719047B2

(12) United States Patent
Rhodes et al.

(10) Patent No.: US 12,719,047 B2
(45) Date of Patent: Aug. 25, 2026

(54) DUAL LAYER GRADIENT ELECTRODE STRUCTURE FOR OPTIMIZED POWER AND ENERGY DENSITY IN BATTERIES

(71) Applicant: Lyten, Inc., San Jose, CA (US)

(72) Inventors: Kevin Rhodes, Dearborn, MI (US); Arjun Mendiratta, La Honda, CA (US)

(73) Assignee: Lyten, Inc., San Jose, CA (US)

( * ) Notice: Subject to any disclaimer, the term of this patent is extended or adjusted under 35 U.S.C. 154(b) by 671 days.

(21) Appl. No.: 17/972,472

(22) Filed: Oct. 24, 2022

(65) Prior Publication Data

US 2024/0136508 A1 Apr. 25, 2024
US 2024/0234696 A9 Jul. 11, 2024

(51) Int. Cl.

| | |
|---|---|
| ***H01M 10/052*** | (2010.01) |
| ***H01M 4/02*** | (2006.01) |
| ***H01M 4/133*** | (2010.01) |
| ***H01M 4/36*** | (2006.01) |
| ***H01M 4/587*** | (2010.01) |

(52) U.S. Cl.

CPC ........... *H01M 4/366* (2013.01); *H01M 4/133* (2013.01); *H01M 4/587* (2013.01); *H01M 2004/021* (2013.01)

(58) Field of Classification Search

CPC ...... H01M 4/366; H01M 4/133; H01M 4/587; H01M 2004/021; H01M 10/052; Y02E 60/10

See application file for complete search history.

(56) References Cited

U.S. PATENT DOCUMENTS 4,999,262 A 3/1991 Prince
5,143,709 A 9/1992 Labes
(Continued)

FOREIGN PATENT DOCUMENTS

CA 2032137 C 3/1995
CN 100541870 C 9/2009
(Continued)

OTHER PUBLICATIONS

Notice of Allowance from U.S. Appl. No. 17/972,482, dated Nov. 15, 2023.
(Continued)

*Primary Examiner* — Lisa S Park
(74) *Attorney, Agent, or Firm* — Zilka-Kotab, P.C.

(57) ABSTRACT

A dual-layer gradient electrode structure is provided for optimizing power and energy density in batteries. In use, for an electrode of a lithium-based battery, the electrode includes a first layer above an electrically conductive substrate, the first layer including a first plurality of carbon aggregates having a first porosity. Additionally, a second layer is above, at least in part, the first layer, the second layer having a second porosity, and including a second plurality of carbon aggregates. The second plurality of carbon aggregates includes a first group of aggregates and a second group of aggregates. The first group of aggregates is characterized by a first porous structure, and the second group of aggregates is characterized by a second porous structure. Further, the second porous structure is characterized by a density greater than the first porous structure, and the second porosity is greater than the first porosity.

22 Claims, 6 Drawing Sheets

(56) References Cited

U.S. PATENT DOCUMENTS 5,324,553 A 6/1994 Ovshinsky et al.
5,436,093 A 7/1995 Huang et al.
6,031,711 A 2/2000 Tennent et al.
6,099,960 A 8/2000 Tennent et al.
6,156,114 A 12/2000 Bell et al.
6,733,924 B1 5/2004 Skotheim et al.
6,757,154 B2 6/2004 Reynolds, III et al.
6,830,595 B2 12/2004 Reynolds, III
7,071,258 B1 7/2006 Jang et al.
7,206,189 B2 4/2007 Reynolds, III
7,465,519 B2 12/2008 Tang et al.
7,623,340 B1 11/2009 Song et al.
7,745,047 B2 6/2010 Zhamu et al.
7,771,870 B2 8/2010 Affinito et al.
7,785,730 B2 8/2010 Affinito et al.
7,824,651 B2 11/2010 Zhamu et al.
7,842,421 B2 11/2010 Mikhaylik
7,875,219 B2 1/2011 Zhamu et al.
8,076,024 B2 12/2011 Affinito et al.
8,114,375 B2 2/2012 Jang et al.
8,119,288 B2 2/2012 Zhamu et al.
8,132,746 B2 3/2012 Zhamu et al.
8,241,793 B2 8/2012 Zhamu et al.
8,338,034 B2 12/2012 Affinito et al.
8,415,054 B2 4/2013 Skotheim et al.
8,497,225 B2 7/2013 Zhamu et al.
8,524,067 B2 9/2013 Zhamu et al.
8,603,680 B2 12/2013 Affinito et al.
8,617,748 B2 12/2013 Mikhaylik et al.
8,624,222 B2 1/2014 Liu et al.
8,748,043 B2 6/2014 Mikhaylik
8,936,870 B2 1/2015 Affinito et al.
8,940,145 B1 1/2015 Chen et al.
9,005,809 B2 4/2015 Wilkening et al.
9,034,421 B2 5/2015 Mikhaylik et al.
9,040,197 B2 5/2015 Affinito et al.
9,040,201 B2 5/2015 Affinito et al.
9,099,744 B2 8/2015 Janssen et al.
9,190,667 B2 11/2015 Zhamu et al.
9,190,694 B2 11/2015 Lopez et al.
9,246,185 B2 1/2016 Kretschmar et al.
9,419,274 B2 8/2016 Wilkening et al.
9,437,344 B2 9/2016 Zhamu et al.
9,577,243 B2 2/2017 Schmidt et al.
9,666,899 B2 5/2017 He et al.
9,994,959 B2 6/2018 Laramie et al.
9,994,960 B2 6/2018 Laramie et al.
10,020,494 B2 7/2018 Wang et al.
10,083,801 B2 9/2018 Zhamu et al.
10,290,876 B2 5/2019 Prieto et al.
10,461,372 B2 10/2019 Laramie et al.
10,535,902 B2 1/2020 Laramie et al.
10,622,666 B2 4/2020 Wachsman et al.
10,720,648 B2 7/2020 Quero-Mieres et al.
10,734,653 B2 8/2020 Lanning et al.
10,879,527 B2 12/2020 Laramie et al.
11,127,941 B2 9/2021 Lanning et al.
11,239,504 B2 2/2022 Laramie et al.
11,870,063 B1 1/2024 Rhodes et al.
2002/0012846 A1 1/2002 Skotheim et al.
2005/0123467 A1 6/2005 Harutyunyan
2007/0221265 A1 9/2007 Affinito et al.
2007/0224502 A1 9/2007 Affinito et al.
2009/0022649 A1 1/2009 Zhamu et al.
2009/0028777 A1 1/2009 Zhamu et al.
2009/0117467 A1 5/2009 Zhamu et al.
2009/0291353 A1 11/2009 Affinito et al.
2010/0291442 A1 11/2010 Wang et al.
2010/0327811 A1 12/2010 Affinito et al.
2011/0177398 A1 7/2011 Affinito et al.
2012/0043940 A1 2/2012 Affinito et al.
2012/0058397 A1 3/2012 Zhamu et al.
2012/0088154 A1 4/2012 Liu et al.
2013/0065034 A1 3/2013 Muramatsu
2013/0095380 A1 4/2013 Affinito et al.
2013/0143096 A1 6/2013 Affinito et al.
2013/0216915 A1 8/2013 Affinito et al.
2014/0170483 A1 6/2014 Zhang et al.
2014/0255785 A1 9/2014 Do et al.
2014/0313636 A1 10/2014 Tour et al.
2015/0044565 A1 2/2015 Wang et al.
2015/0210558 A1 7/2015 Dickinson et al.
2015/0291431 A1 10/2015 Tang et al.
2016/0027934 A1 1/2016 Noyes
2016/0043384 A1 2/2016 Zhamu et al.
2016/0207291 A1 7/2016 Dimitrakopoulos et al.
2016/0308218 A1 10/2016 Ota et al.
2016/0344067 A1 11/2016 Laramie et al.
2016/0372743 A1 12/2016 Cho et al.
2017/0018815 A1 1/2017 Laramie et al.
2017/0062821 A1 3/2017 Tour et al.
2017/0141385 A1 5/2017 Scordilis-Kelley et al.
2017/0174520 A1 6/2017 Walters et al.
2017/0338475 A1 11/2017 Laramie et al.
2018/0277850 A1 9/2018 Quero-Mieres et al.
2018/0327611 A1 11/2018 Scheffer et al.
2019/0088958 A1 3/2019 Viner et al.
2019/0210345 A1 7/2019 Lin et al.
2019/0235392 A1 8/2019 Jeunink et al.
2020/0099108 A1 3/2020 Laramie et al.
2020/0235392 A1 7/2020 Jang
2020/0373578 A1 11/2020 Wang et al.
2021/0036312 A1 * 2/2021 Lanning ................ H01M 4/622
2021/0126243 A1 4/2021 Lanning et al.
2021/0135205 A1 5/2021 Laramie et al.
2021/0151830 A1 5/2021 Shayan et al.
2022/0190396 A1 6/2022 Laramie et al.
2023/0061388 A1 3/2023 Tashita et al.

FOREIGN PATENT DOCUMENTS

CN 102674321 A 9/2012
JP 2010095390 A 4/2010
KR 101785064 B1 10/2017
WO 2012039533 A1 3/2012
WO 2014048390 A1 4/2014
WO 2015048583 A1 4/2015
WO 2017127674 A1 7/2017
WO 2018122368 A1 7/2018

OTHER PUBLICATIONS

Rhodes et al., U.S. Appl. No. 17/972,482, filed Oct. 24, 2022.

Ji et al., "A highly ordered nanostructured carbon-sulphur cathode for lithium-sulphur batteries," Nature Materials, vol. 8, Jun. 2009, pp. 500-506.

Schuster et al., "Spherical Ordered Mesoporous Carbon Nanoparticles with High Porosity for Lithium-Sulfur Batteries," Angewandte Chemie International Edition, vol. 124, 2012, pp. 36511-3655.

Shaibani et al., "Expansion-tolerant architectures for stable cycling of ultrahigh-loading sulfur cathodes in lithium-sulfur batteries," Science Advances, vol. 6, Jan. 3, 2020, pp. 1-11.

Wang et al., "Sulfur-mesoporous carbon composites in conjunction with a novel ionic liquid electrolyte for lithium rechargeable batteries," Carbon, vol. 46, 2008, pp. 229-235.

Yang et al., "New Nanostructured Li2S/Silicon Rechargeable Battery with High Specific Energy," Nano Letters, vol. 10, Feb. 2010, pp. 1486-1491.

Novoselov et al., "Electric Field Effect in Atomically Thin Carbon Films," Science, Oct. 22, 2004, pp. 1-3.

Takamura et al., "A key technology to improve the cyclic performances of carbonaceous materials for lithium secondary battery anodes," Science Direct Journal of Power Sources, vol. 68, Sep. 1997, pp. 114-119.

Rothlisberger et al., "Ab Initio Molecular Dynamics Investigation of Singlet C2H2Li2: Determination of the Ground State Structure and Observation of LiH Intermediates," Journal of the American Chemical Society, 1995, vol. 117, pp. 42-48.

Menachem et al., "Characterization of Lithiated Natural Graphite Before and Aller Mild Oxidation," Science Direct Journal of Power Sources vol. 76, Dec. 1, 1998, pp. 180-185.

(56) References Cited

OTHER PUBLICATIONS

Menachem et al., "Characterization of modified NG7 graphite as an improved anode for lithius-ion batteries," Science Direct Journal of Power Sources, vol. 68, Oct. 1997, pp. 277-282.
Ein-Eli et al., "Chemical Oxidation: A Route to Enhanced Capacity in Li-Ion Graphite Anodes," Journal of The Electrochemical Society, vol. 144, 1997, pp. 2968-2973 (.
Maguire et al., "Continuous In-flight Synthesis for On-Demand Delivery of Ligand-Free Colloidal Gold Nanoparticles," Nano Letters, vol. 17, 2017, pp. 1336-1343.
Dabrowska et al., "Current Trends in the Development of Microwave Reactors for the Synthesis of Nanomaterials in Laboratories and Industries: A Review," Crystals, vol. 8, 2018; pp. 1-26.
Zheng et al., "Activated graphene with tailored pore structure parameters for long cycle-life lithium-sulfur batteries," Nano Research, vol. 10, 2017, pp. 4305-4317.
Xue et al., "Dramatic Effect of Oxidation on Lithium Insertion in Carbons Made from Epoxy Resins," Journal of The Electrochemical Society, vol. 142, 1995, pp. 3668-3677.
Disma et al., "Effect of Mechanical Grinding on the Lithium Intercalation Process in Graphites and Soft Carbons," Journal of The Electrochemical Society, vol. 143, 1996, pp. 3959-3972.
An et al., "Electrochemical Properties of High-Power Supercapacitors Using Single-Walled Carbon Nanotube Electrodes," Advanced Functional Materials, vol. 11, Oct. 2, 2001, pp. 387-392 (Abstract Only).
Wu et al., "Effects of catalytic oxidation on the electrochemical performance of common natural graphite as an anode material for lithium ion batteries," Electrochemistry Communications, vol. 2, Apr. 1, 2000, pp. 272-275.
Qiu et al., "Explosive thermal reduction of graphene oxide-based materials: mechanism and safety implications," NIH Public Access, Author Manuscript, Jun. 2014, pp. 1-18.
Yazami et al., "High reversible capacity carbon-lithium negative electrode in polymer electrolyte," Journal of Power Sources, vol. 54, Apr. 1995, pp. 411-415.
Zheng et al., "High-Capacity Carbons Prepared from Phenolic Resin for Anodes of Lithium-Ion Batteries," Journal of The Electrochemical Society, vol. 142, pp. L211-L214.
Lu et al., "Improving Li anode performance by a porous 3D carbon paper host with plasma assisted sponge carbon coating," Energy Storage Materials, vol. 11, 2018, pp. 47-56.
Zhang, S., "Liquid electrolyte lithium/sulfur battery: Fundamental chemistry, problems, and solutions," Journal of Power Sources, vol. 231, Jun. 1, 2013, pp. 153-162.
Korthauer, R., "Lithium-Ion Batteries: Basics and Applications," Springer-Verlag Berlin Heidelberg, Copyright Aug. 7, 2018.
Buqa et al., "Modified carbons for improved anodes in lithium ion cells," Journal of Power Sources, vol. 97-98, Jul. 2001, pp. 122-125.
Lee et al., "Li Absorption and Intercalation in Single Layer Graphene and Few Layer Graphene by First Principles," Nano Letters, vol. 12, Sep. 12, 2012, pp. 4624-4628.
Shi et al., "Material and Structural Design of Novel Binder Systems for High-Energy, High-Power Lithium-Ion Batteries," Accounts of Chemical Research, vol. 56, pp. 2642-2652.
Ji et al., "Lithium intercalation into bilayer graphene," Nature Communications, vol. 19, 2019, pp. 1-10.
Jurewicz et al., "Supercapacitors from nanotubes/polypyrrole composites," Chemical Physics Letters, vol. 347, Oct. 2001, pp. 36-40.
Huang et al., "Well-dispersed single-walled carbon nanotube/polyaniline composite films," Carbon, vol. 41, 2003, pp. 2731-2736.
Mistry et al. "'Shuttle' in Polysulfide Shuttle: Friend or Foe?" Journal of Physical Chemistry C, vol. 122, Oct. 5, 2018, pp. 23845-23851.
Son et al., "Graphene balls for lithium rechargeable batteries with fast charging and high volumetric energy densities," Nature Communications, vol. 8, Nov. 2017, pp. 1-11, retrieved from https://www.nature.com/articles/s41467-017-01823-7.
Wang et al., "Graphene-Wrapped Sulfur Particles as a Rechargeable Lithium-Sulfur Battery Cathode Material with High Capacity and Cycling Stability," Nano Letters, vol. 11, 2011, plus supporting information, 9 pages.
Lee et al., "High-Energy Long-Cycling All-Solid-Slate Lithium Metal Batteries Enabled by Silver-Carbon Composite anodes," Nature Energy, vol. 5, 2020, pp. 299-308.
Zhou et al., "Recent Developments on and Prospects for Electrode Materials with Hierarchical Structures for Lithium-Ion Batteries," Advanced Energy Materials, 2018, pp. 1-23.
Rodrigues et al., "A materials perspective on Li-ion batteries at extreme temperatures," Nature Energy, vol. 2, Jul. 24, 2017, pp. 1-14.
Zhang et al., "Three-dimensional bicontinuous ultrafast-charge and -discharge bulk battery electrodes," Nature Nanotechnology, vol. 6, Mar. 2011, pp. 1-5.
Agostini et al., "A high-power and fast charging Li-ion battery with outstanding cycle-life," Scientific Reports, vol. 7, 2017, pp. 1-7.
Pu et al., "Conductivity and lithiophilicity gradients guide lithium deposition to mitigate short circuits," Nature Communications, 2019, pp. 1-10.
Kalnaus et al., "Design and processing for high performance Li ion battery electrodes with double-layer structure," Preprint, Journal of Energy Storage, Oct. 18, 2021, 25 pages.
Chen et al., "Porous cathode optimization for lithium cells: Ionic and electronic conductivity, capacity, and selection of materials," Journal of Power Sources, vol. 195, pp. 2851-2862.
Cai et al., "Multicomponent two-layered cathode for thick sintered lithium-ion batteries," Materials Advances, vol. 3, 2022, pp. 4200-4212.
Tao et al., "Plane Double-Layer Structure of AC@S Cathode Improves Electrochemical Performance for Lithium-Sulfur Battery," Frontiers in Chemistry, vol. 6, Oct. 29, 2018, pp. 1-11.
Wang et al., "3D Porous Spherical Sulfur/Carbon Cathode Materials with in Situ Vapor-Phase Polymerized Polypyrrole Coating Layer for HighPerformance Lithium?Sulfur Batteries," ACS Sustainable Chemistry and Engineering, vol. 7, 2019, pp. 17491-17499.
Final Office Action from U.S. Appl. No. 17/972,482, dated Jul. 20, 2023.
Advisory Action from U.S. Appl. No. 17/972,482, dated Aug. 17, 2023.
Restriction Requirement from U.S. Appl. No. 17/972,482, dated Jan. 23, 2023.
International Search Report and Written Opinion from PCT Application No. PCT/US23/33294, dated Mar. 14, 2024, 10 pages.
Non-Final Office Action from U.S. Appl. No. 17/972,482, dated Mar. 16, 2023.

* cited by examiner

DUAL LAYER GRADIENT ELECTRODE STRUCTURE FOR OPTIMIZED POWER AND ENERGY DENSITY IN BATTERIES

RELATED APPLICATIONS

The present application incorporates by reference the following application in its entirety for all purposes: U.S. application Ser. No. 17/972,482 entitled "DUAL LAYER GRADIENT ELECTRODE STRUCTURE FOR REDUCING SULFIDE TRANSFER" filed Oct. 24, 2022.

FIELD OF THE INVENTION

The present invention relates to batteries, and more particularly to optimizing power and energy density in batteries.

BACKGROUND

Currently, inevitable limits on both energy density and power density are introduced when attempting to minimize mass and volume in lithium-based battery technology. For example, in conventional systems, there is usually a trade-off between mass and volume, and the resulting energy density and density power. Further, conventional systems must often choose between a high-density capacity, or a high porosity (to allow for ion exchange/passage). For example, thick cathodes may result in high energy density but reduced power density. Very dense layers may reduce porosity but may be limited in the overall thickness due to ion percolation pathway limitations.

As such, there is thus a need for addressing these and/or other issues associated with the prior art.

SUMMARY

A dual-layer gradient electrode structure is provided for optimizing power and energy density in batteries. In use, for an electrode of a lithium-based battery, the electrode includes a first layer above an electrically conductive substrate, the first layer including a first plurality of carbon aggregates having a first porosity. Additionally, a second layer is above, at least in part, the first layer, the second layer having a second porosity, and including a second plurality of carbon aggregates. The second plurality of carbon aggregates includes a first group of aggregates and a second group of aggregates. The first group of aggregates is characterized by a first porous structure, and the second group of aggregates is characterized by a second porous structure. Further, the second porous structure is characterized by a density greater than the first porous structure, and the second porosity is greater than the first porosity.

In various embodiments, the first group of aggregates may be characterized by a first conductivity, the second group of aggregates may be characterized by a second conductivity, and the second conductivity may be greater than the first conductivity.

In various embodiments, the first layer may have a concentration of carbon aggregates that may be different from a concentration of carbon aggregates in the second layer. Additionally, the first layer may have a concentration of carbon aggregates that is greater than a concentration of carbon aggregates in the second layer. Further, the first layer may have a thickness between 10 microns and 200 microns.

In various embodiments, the second layer may entirely cover at least one surface of the first layer. Moreover, the second layer may be constructed as a series of rows, where each row of the series of rows may cover a portion of the first layer. The second layer may be deposited as a series of rows onto the first layer, each row of the series of rows allowing for ion penetration across each surface of the row. Additionally, a third layer may be above, at least in part, the second layer, the third layer including a third plurality of carbon aggregates having a third porosity. Additionally, the third porosity may be less than the second porosity.

In various embodiments, the first porous structure may include a first plurality of interconnected channels, the second porous structure may include a second plurality of interconnected channels, and/or the first plurality of interconnected channels and the second plurality of interconnected channels may be coupled to one another. For example, the first plurality of interconnected channels may be coupled to the second plurality of interconnected channels. In other embodiment, the first plurality of interconnected channels may come in contact with (and/or interface at a surface layer) the second plurality of interconnected channels. The first porous structure and/or the second porous structure may each include a first portion configured to provide a lithium ion conduit, a second portion configured to facilitate rapid lithium ion transport, and a third portion configured to confine lithium sulfide.

In various embodiments, the electrode may be an anode or a cathode. Further, in some embodiments, the first layer may be characterized by a first property to maximize ion density, and the second layer may be characterized by a second property to maximize percolation channels.

In various embodiments, the second porosity may be characterized by a continuous gradient from the first porous structure to the second porous structure. Additionally, the first porous structure may comprise a first set of agglomerates, the first set of agglomerates including interstitial spacing of a first dimension. The second porous structure may comprise a second set of agglomerates, the second set of agglomerates including interstitial spacing of a second dimension.

In various embodiments, the second layer may be a hierarchal layering based on the first porous structure, the second porous structure, the second porosity, and interstitial spacing. Additionally, the interstitial spacing may be based, at least in part, on a solvent used to create one or both of the first porous structure and the second porous structure. Further, a third layer may be above, at least in part, the second layer, the third layer including a third plurality of carbon aggregates, wherein the third layer is a buffer layer that minimizes interface growth or dendrite growth.

Additionally, an electrode of a lithium-based battery may comprise a first layer disposed above an electrically conductive substrate, the first layer including a first plurality of carbon aggregates having a first porosity. Additionally, the electrode may comprise a second layer disposed above the first layer, the second layer including a second plurality of carbon aggregates, the second layer including a second porosity which is greater than the first porosity, where a first group of particles of the second layer has a first concentration of interacting functional groups, and a second group of particles of the second layer has a second concentration of the interacting functional groups, the second concentration being greater than the first concentration.

In various embodiments, the interacting functional groups may be characterized by one or more of: polar groups, catalysts, solid state electrolyte particles, and a carbonaceous growth(s). The polar groups may be coupled together by polar covalent bonds, and the polar groups include one or more of nitrogen groups, oxygen groups, and hydroxyl groups. Additionally, the catalysts may exhibit polar activity, and the catalysts may include one or more of tungsten carbide, and magnesium oxide. Further, the solid state electrolyte particles may include lithium lanthanum zirconium oxide (LLZO, Li7La3Zr2O12).

In various embodiment, the first concentration and the second concentration may be based on a frequency of the interacting functional groups within each of the first group of particles and the second group of particles respectively. Additionally, the interacting functional groups may impede polysulfide movement while allowing for Li ion transport.

In various embodiments, the electrode may be a cathode. Additionally, the first layer may have a thickness between 10 microns and 200 microns.

In various embodiments, the first group of particles may be characterized by a first porous structure, and the second group of particles may be characterized by a second porous structure. Additionally, the first porous structure may be characterized by a first interstitial spacing, and the second porous structure may be characterized by a second interstitial spacing.

In various embodiments, the first concentration may be a first percent weight of the interacting functional groups, and the second concentration may be a second percent weight of the interacting functional groups. Additionally, the second porosity may be characterized by a continuous gradient from the first group of particles to the second group of particles. A concentration gradient may exist between the first concentration and the second concentration. Further, the interacting functional groups may act as polymer cages for polysulfides. The first concentration may have a first amount of interaction with polysulfides, and the second concentration may have a second amount of interaction with the polysulfides. Still yet, the interacting functional groups may substantially block polysulfides.

DETAILED DESCRIPTION

Figure 1:
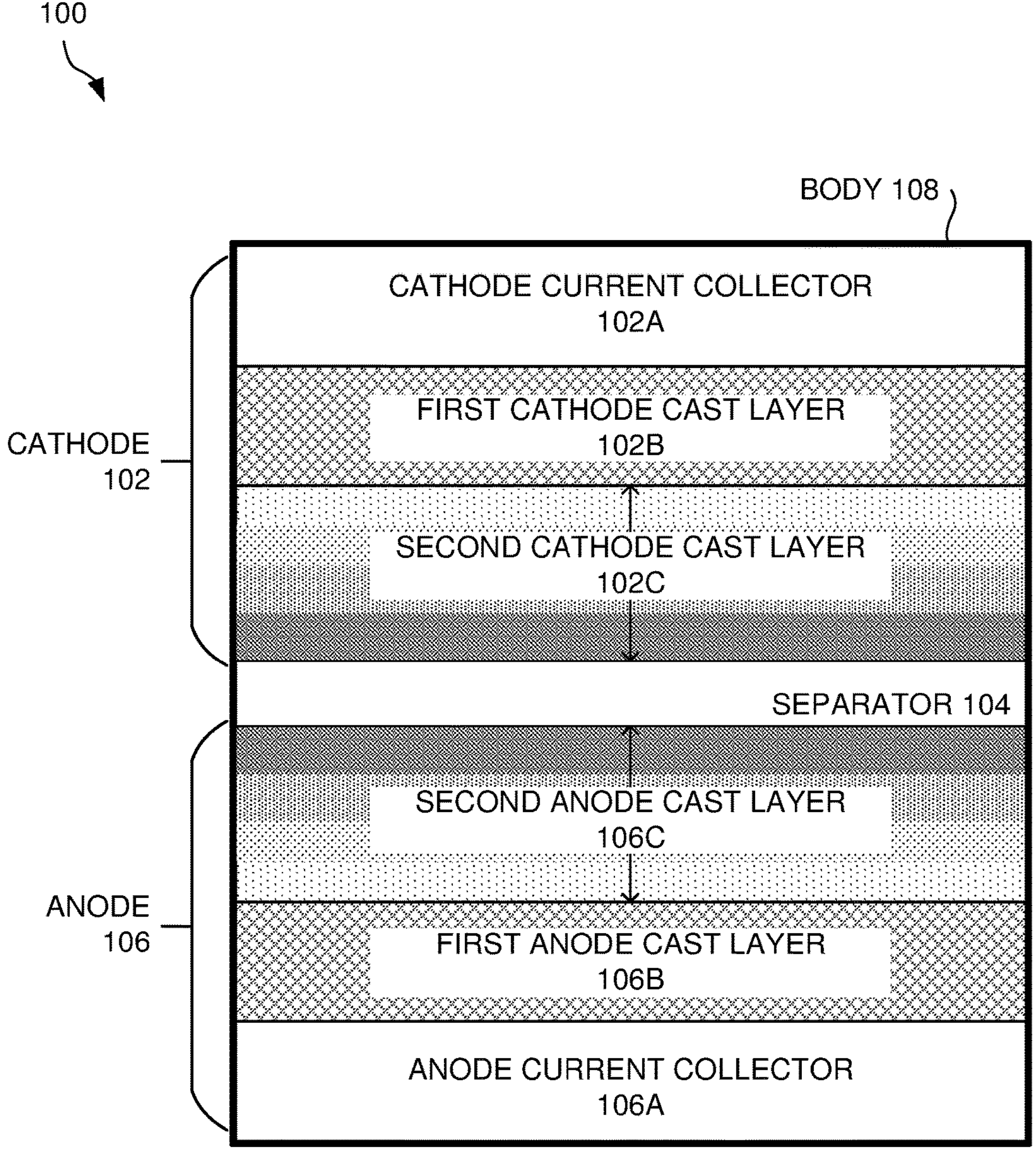
FIG. 1 illustrates a dual-layer anode and cathode within a battery structure, in accordance with one embodiment.

In conventional single layer battery electrodes, there is a need to balance power and energy capability. Thick cathodes may result in high energy density but reduce power density. Very dense layers may reduce porosity (which may thereby provide high energy density), and may be limited by a thickness (due to reduce ion percolation pathway). High power electrodes may provide high degrees of ion (such as Li+) percolation pathways to maximize the rate of ion transfer. These properties are generally mutually exclusive and driven engineering decisions based on application need.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

Within the context of the present description, agglomerates include any resulting compounds and/or particles formed. In one embodiment, agglomerates may be a result of one of a variety of forces bringing two or more other compounds and/or particles together. Further, the term gradient refers to an increase or decrease in a magnitude of concentration. In one embodiment, gradient may include a hierarchal arrangement based on a stacking of a pore structure, agglomerates, interstitial spacing, and porosity items within a layer.

Descriptions of Exemplary Embodiments

FIG. 1 illustrates a dual-layer anode and cathode within a battery structure 100, in accordance with one embodiment. As an option, the battery structure 100 may be implemented in the context of any one or more of the embodiments set forth in any subsequent figure(s) and/or description thereof. Of course, however, the battery structure 100 may be implemented in the context of any desired environment. Further, the aforementioned definitions may equally apply to the description below.

As shown, the battery structure 100 is comprised of a cathode 102, an anode 106, and a separator 104 encased within a body 108 (i.e. battery body). In addition, the cathode 102 is comprised of a cathode current collector 102A, a first cathode cast layer 102B, and a second cathode cast layer 102C. Further, the anode 106 is comprised of an anode current collector 106A, a first anode cast layer 106B, and a second anode cast layer 106C. It is to be appreciated that the battery structure 100 represents just one configuration, and that other alterations (i.e., fixed, replaceable, cylindrical, prismatic, pouch, a plurality of individual cells organized as a pack, designed to emphasize increased power output vs. increased longevity, etc.) are envisioned.

The battery structure 100 shows both implementation within the cathode 102 and the anode 106. It is to be appreciated that the cast layers presented may exist in either of, or both of, the cathode 102 and the anode 106. Additionally, modifications in the application of the cast layers may be made to each of the cathode 102 and the anode 106 as needed (e.g. based on electrode specific requirements). For example, the first cathode cast layer 102B and the second cathode cast layer 102C may be optimized to limit lithium polysulfide transfer of the cathode 102.

As such, each electrode (the cathode 102 and the anode 106) of the battery structure 100 may be composed of two distinct cast layers (or potentially more than two) to make up a cast electrode for a battery. The bottommost layer (in contact with the current collection) may be composed of a relatively dense layer, the first cast layer (such as the first anode cast layer 106B and/or the first cathode cast layer 102B). The first cast layer (dense layer) may include active materials (in its primary particle state) along with appropriate binder and optional conductive additive. The first cast layer (dense layer) may have a limited thickness (i.e. needs to be thin enough to allow ion transfer).

The second cast layer (such as the second cathode cast layer 102C and/or the second anode cast layer 106C) may be cast on top of the first cast layer. The second cast layer may utilize an active material which may be processed into a secondary aggregate where the porosity has been tuned. The second cast layer may include a relevant binder and optional conductive additive. The second cast layer may be significantly thicker than the first layer due the increased interparticle porosity developed between the aggregate structures.

The binders and solvents used for casting the first cast layer and the second cast layer may be the same or distinct in order to control the interfacial mixing between the two layers as needed. In various embodiments, this dual layer (comprising a first cast layer and a second cast layer) structure may improve the energy density that may be achieved. For example, the first cast layer may have greater power density but may be limited in its thickness. The second cast layer may have lower power density but may have a thicker layer (due to increase porosity). In this manner, this dual structure provides for a porosity structure in the electrode that optimizes both energy density and lithium percolation channels.

In one embodiment, the particle used within the first cast layer and/or the second cast layer may include a sulfurized carbon primary particle. Additionally, the particle may be applied using a spray dried technique.

In one embodiment, the first cast layer (such as the first cathode cast layer 102B and/or the first anode cast layer 106B) may above on an electrically conductive substrate, the first cast layer including a first plurality of carbon aggregates having a first porosity. In various embodiments, the first cast layer (or any of the cast layers) may be located above a foregoing layer, the cast layer having some direct contact (at least in part) with the foregoing layer. For example, the cast layer may have gaps and/or impurities which may prevent a complete deposition onto the foregoing surface.

Additionally, the first cast layer may have a concentration of carbon aggregates that is different from a concentration of carbon aggregates in the second layer. In addition, the first cast layer may have a concentration of carbon aggregates that is greater than a concentration of carbon aggregates in the second layer. Further, the first layer may have a thickness between 10 microns and 200 microns. Further still, the first cast layer may be characterized by a first property to maximize ion density, and the second layer may be characterized by a second property to maximize percolation channels.

In another embodiment, a second cast layer (such as the second cathode cast layer 102C and/or the second anode cast layer 106C) may be above, at least in part, the first layer. In a related context, the second cast layer may be constructed as a series of rows (described in further detail within the context of FIG. 5), each row of the series of rows covering a portion of the first cast layer wherein each row of the series of rows allows for ion penetration across each surface of the row. Additionally, the second cast layer may be a hierarchal layering characterized by the first porous structure, the second porous structure, the second porosity, and interstitial spacing. Further, the interstitial spacing may be based, at least in part, on a solvent used to create one or both of the first porous structure and the second porous structure. In yet another embodiment, the second layer may cover the first layer entirely.

In one embodiment, the second cast layer may have a second porosity, and include a second plurality of carbon aggregates. In addition, the second plurality of carbon aggregates may include a first group of the second plurality of carbon aggregates, where the first group has a first porous structure. The second plurality of carbon aggregates may include a second group of the second plurality of carbon aggregates. Additionally, the second group may have a second porous structure that is denser than the first porous structure, and the second porosity may be greater than the first porosity. Additionally, each of the first porous structure and the second porous structure may each include a plurality of interconnected channels, and each of the interconnected channels may include a first portion configured to provide a lithium ion conduit, a second portion configured to facilitate rapid lithium ion transport, and a third portion configured to confine lithium sulfide. Further, the second porosity may be characterized by a continuous gradient from the first porous structure to the second porous structure. Further still, the first porous structure may comprise a first set of agglomerates, the first set of agglomerates including interstitial spacing of a first dimension, and second porous structure comprise a second set of agglomerates, the second set of agglomerates including interstitial spacing of a second dimension.

In another embodiment, a third layer may be above, at least in part, the second layer, the third layer including a third plurality of carbon aggregates having a third porosity, where the third porosity is less than the second porosity. Additionally, the third layer may include a third plurality of carbon aggregates, where the third layer is a buffer layer that minimizes interface growth or dendrite growth.

In yet another embodiment, an electrode component of the battery comprises an anode 106 or a cathode 102. In one embodiment, the cathode 102 and anode 106 may be comprised of various forms of carbon-based materials including graphite and graphene. In addition, the graphite and/or graphene construction materials may also include additives in the form of silicone, silicon-based alloys, and/or nanostructured lithium-titanate. Further, the cathode 102 and anode 106 may contain any of a variety of electrolyte compounds to facilitate lithium ion transfer through the separator 104. Such materials may include, by way of non-limiting examples, simple concentrated saline, lithium cobalt oxide ($LiCoO_2$), lithium iron phosphate ($LiFePO_4$), lithium manganese oxide ($LiMn_2O_4$), lithium nickel manganese cobalt oxide ($LiNiMnCoO_2$), and/or Ga-doped lithium lanthanum zirconium oxide ($Li_7La_3Zr_2O_{12}$). In one embodiment, a lithium battery electrolyte composition may be composed of solvent, lithium salt, and a variety of additives. The lithium battery solvent may include cyclic carbonate (PC, EC), chain carbonate (DEC, DMC, EMC), and/or carboxylic acid esters (MF, MA, EA, MA, MP, etc.). Additionally, the lithium salt element of the electrolyte may comprise a variety of compounds including $LiPF_6$, $LiClO_4$, $LiBF_4$, $LiAsF_6$, etc. In addition, additives within the electrolyte may include film-forming additives, conductive additives, flame retardant additives, overcharge protection additives, additives that may control $H_2O$ and HF content in the electrolyte, additives that may improve low-temperature performance, and other functional additives. In one embodiment, an electrolyte compound may be employed in liquid, gelatinous, or solid form, or a combination thereof.

In one embodiment, the separator 104 may comprise a very porous structure, in the pores of which liquid resides, thus creating a closed membrane-like structure through which lithium ions may freely pass and through which free electrons may not pass. For example, a lithium-ion separator may include pore size ranges from 30 to 100 nanometers. Additionally, a separator may feature a porosity of 30 to 50 percent, which may allow for retention of adequate liquid electrolyte to enable the pores to close in the event that a battery cell may possibly overheat.

In one embodiment, modern lithium ion battery structures may include polyolefin as the separator 104. Polyolefin may be produced a class of polymer produced from olefin by polymerizing olefin ethylene. It should be appreciated that, where ethylene may originate from a petrochemical source, polyolefin may be made from polyethylene, polypropylene, and/or a laminate comprised of a combination of both polyethylene and polypropylene. In another embodiment, historic and/or traditional early-generation separator materials may include rubber, glass fiber mat, cellulose, polyethylene plastic, porous polyolefin films, nylon or cellophane, and even wood.

In various embodiments, the first cast layer may be very dense with very few percolation ion channels. In one embodiment, the percolation ion channels may allow (and thereby limit) penetration of ions (e.g. lithium). The first cast layer may be less than a few micros thick (which may be directly contingent upon rate capability limitations), such as, in one embodiment, between 10 microns and 200 microns.

In other embodiments, the second cast layer may be used to reduce polysulfide effects. For example, in one embodiment, an electrode of a lithium-based battery may comprise a first layer disposed above an electrically conductive substrate, the first layer including a first plurality of carbon aggregates having a first porosity. Additionally, the electrode may comprise a second layer disposed above the first layer, the second layer including a second plurality of carbon aggregates, the second layer including a second porosity which is greater than the first porosity, where a first group of particles of the second layer has a first concentration of interacting functional groups, and a second group of particles of the second layer has a second concentration of the interacting functional groups, the second concentration being greater than the first concentration.

In various embodiments, the interacting functional groups may be characterized by one or more of: polar groups, catalysts, solid state electrolyte particles, and a carbonaceous growth(s). The polar groups may be coupled together by polar covalent bonds, and the polar groups include one or more of nitrogen groups, oxygen groups, and hydroxyl groups. Additionally, the catalysts may exhibit polar activity, and the catalysts may include one or more of tungsten carbide, and magnesium oxide. Further, the solid state electrolyte particles may include lithium lanthanum zirconium oxide (LLZO, Li7La3Zr2O12).

In various embodiment, the first concentration and the second concentration may be based on a frequency of the interacting functional groups within each of the first group of particles and the second group of particles respectively. Additionally, the interacting functional groups may impede polysulfide movement while allowing for Li ion transport.

In one embodiment, within the context of using interacting functional groups, the electrode may be a cathode. Additionally, the first layer may have a thickness between 10 microns and 200 microns.

In various embodiments, the first group of particles may be characterized by a first porous structure, and the second group of particles may be characterized by a second porous structure. Additionally, the first porous structure may be characterized by a first interstitial spacing, and the second porous structure may be characterized by a second interstitial spacing.

Additionally, in other embodiment, the first concentration may be a first percent weight of the interacting functional groups, and the second concentration may be a second percent weight of the interacting functional groups. Additionally, the second porosity may be characterized by a continuous gradient from the first group of particles to the second group of particles. A concentration gradient may exist between the first concentration and the second concentration. Further, the interacting functional groups may act as polymer cages for polysulfides. The first concentration may have a first amount of interaction with polysulfides, and the second concentration may have a second amount of interaction with the polysulfides. Still yet, the interacting functional groups may substantially block polysulfides.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
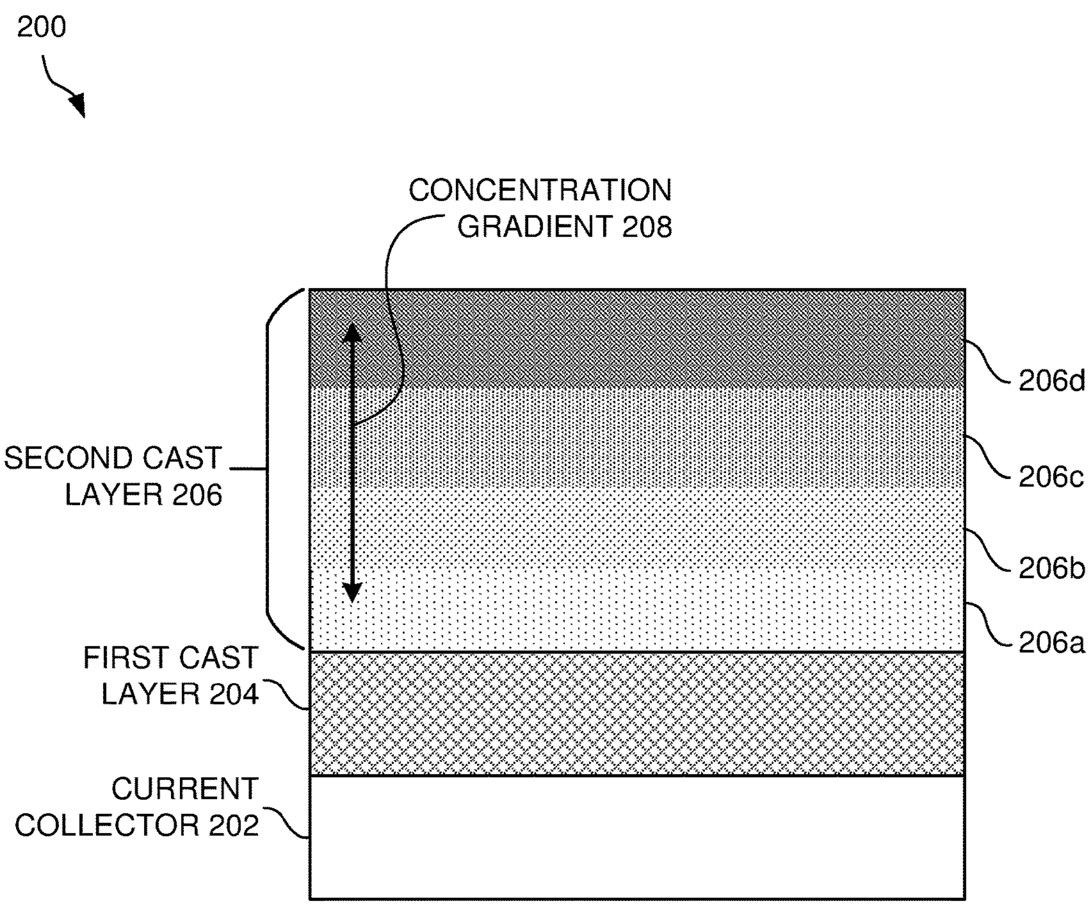
FIG. 2 illustrates a dual-layer electrode structure, in accordance with one embodiment.

FIG. 2 illustrates a dual-layer electrode structure 200, in accordance with one embodiment. As an option, the dual-layer electrode structure 200 may be implemented in the context of any one or more of the embodiments set forth in any previous and/or subsequent figure(s) and/or description thereof. Of course, however, the dual-layer electrode structure 200 may be implemented in the context of any desired environment. Further, the aforementioned definitions may equally apply to the description below.

As shown, the dual-layer electrode structure 200 may be comprised of a current collector 202, a first cast layer 204 (in contact with the current collector 202), and a second cast layer 206 applied over the first cast layer 204. Additionally, the second cast layer 206 may comprise multiple sublayers, including sublayer 206*a*, sublayer 206*b*, sublayer 206*c*, and sublayer 206*d*. In one embodiment, the sublayers 206*a* through 206*d* may each include group of carbon aggregates (which may or may not be different from an adjoining sublayer). Additionally, the sublayers 206*a* through 206*d* may be hierarchical according to a concentration gradient 208.

In one embodiment, the first group of carbon aggregates may be characterized by a first conductivity, and the second group of carbon aggregates may be characterized by a second conductivity. Additionally, the second conductivity may be greater than the first conductivity. In the context of the group of concentration gradients (206*a* through 206*d*), there may be no limit to the number of applied sublayers comprising the second cast layer 206.

In another embodiment, the first cast layer 204 may have a concentration of carbon aggregates that may be different from a concentration of carbon aggregates in the second cast layer 206. Additionally, the first cast layer 204 may have a concentration of carbon aggregates that may be greater than a concentration of carbon aggregates in the second cast layer 206. In addition, the first cast layer 204 may have a thickness between 10 microns and 200 microns. The first cast layer 204 may be characterized by a first property to maximize ion density, and the second cast layer 206 may be characterized by a second property to maximize percolation channels. Further, the second cast layer 206 may be a hierarchal layering based on the first porous structure, the second porous structure, the second porosity, and interstitial spacing. Further still, the interstitial spacing may be based, at least in part, on a solvent used to create one or both of the first porous structure and the second porous structure.

In one embodiment, gradient lithium ion traversal (and reduction of polysulfide transfer) may be achieved by way of chemical interaction, catalytic interaction, polar group interaction, etc. Additionally, charged materials may include tungsten sulfide and/or tungsten carbide. The polar elements in these scenarios may include, but are not limited to, nitrogen or oxygen groups, hydroxyl groups, where catalytic elements may or may not include tungsten carbide and magnesium oxide. In yet another embodiment, the second cast layer 206 may cover the first cast layer 204 entirely.

Additionally, in still another embodiment, an electrode structure may include a type of scaffolding framework designed to preserve the rough three-dimensional "shape" (e.g., to minimize fluctuation) of a group of sublayers. By way of non-limiting example, one layer of such a scaffolding model may feature a first sublayer comprised nearly entirely of lithium electrolyte. Thereupon, a next layer may include a base structure of carbon nanofibers (or a similar carbon aggregate) and/or graphite material designed to retain a sort of consistent form. Additionally, subsequent sublayers may be applied that feature slightly more carbon-based structure as the layers build upon one another and get nearest the battery separator component. In another related embodiment, the sublayer group in question may incorporate almost pure lithium metal nearest the battery collector component with a layer of one or more alloyed lithium composites nearer the separator. In one embodiment, the scaffold-like structure may be employed in the form of an etching within the electrolyte where the scaffolding-type system is essentially anchored down within the electrode for stability. In yet another embodiment, the sublayers of thin lithium may be pre-formed with different concentrations of scaffolding-type material and effectively "rolled-out" into place. Alternatively, different concentrations of lithium alloy sublayers may be put together before assembly into a group of sublayers in the electrolyte. In one manifestation, a pre-formed material may be fashioned using an aqueous n-methyl-2-pyrrolidone (NMP)-based slurry ready to be applied in sublayers according to specific design requirements.

In another further embodiment, the dual-layer electrode structure 200 of the electrode may be an anode or a cathode.

Figure 3:
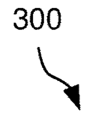
FIG. 3 illustrates a concentration gradient of a plurality of carbon aggregates within the second cast layer of a dual-layer electrode structure, in accordance with one embodiment.
Figure 3:
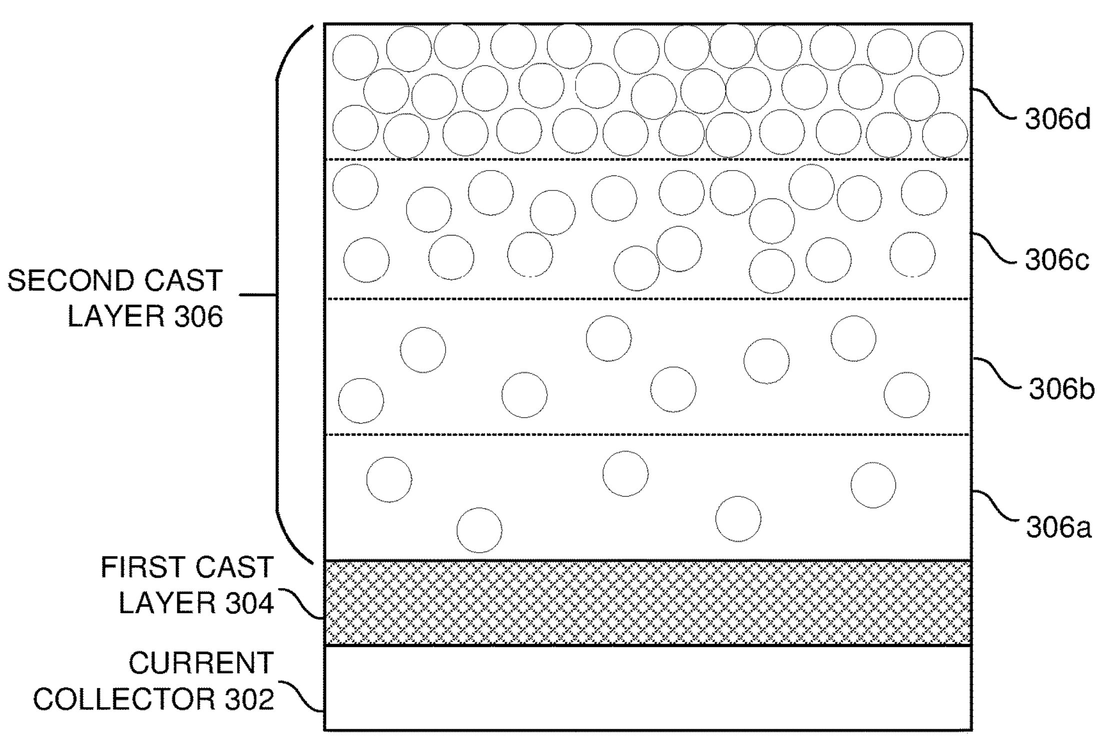

FIG. 3 illustrates a concentration gradient of a plurality of carbon aggregates within the second cast layer of a dual-layer electrode structure 300, in accordance with one embodiment. As an option, the dual-layer electrode structure 300 may be implemented in the context of any one or more of the embodiments set forth in any previous and/or subsequent figure(s) and/or description thereof. Of course, however, the dual-layer electrode structure 300 may be implemented in the context of any desired environment. Further, the aforementioned definitions may equally apply to the description below.

As shown, the dual-layer electrode structure 300 may be comprised of a current collector 302, a first cast layer 304 (in direct contact with the current collector 302), and a second cast layer 306 applied over the first cast layer 304. Additionally, the second cast layer 306 may comprise a group of carbon aggregates including a first carbon aggregate sublayer 306*a* having a first porous structure, a second carbon aggregate sublayer 306*b* having a second porous structure, a third carbon aggregate sublayer 306*c* having a third porous structure, and a fourth carbon aggregate sublayer 306*d* having a fourth porous structure.

The second cast layer 306 is visibly shown with varying levels of concentrations throughout each of the first carbon aggregate sublayer 306*a*, the second carbon aggregate sublayer 306*b*, the third carbon aggregate sublayer 306*c*, and/or the fourth carbon aggregate sublayer 306*d*. It is to be appreciated that the concentration can be predetermined and set (e.g. at the time of spray drying the particles). Each sublayer (306*a* through 306*d*) may each have specific porous structures based on preconfigured considerations. In this manner, the layering of the sublayers 306*a* through 306*d* may include a gradient of varying concentrations of particles.

In one embodiment, some or all of the porous structures of the sublayers 306*a* through 306*d* may include a plurality of interconnected channels. In addition, each of the interconnected channels may be configured for a particular effect. For example, a first layer may be configured to provide a lithium ion conduit, a second layer may be configured to facilitate rapid lithium ion transport, and/or a third layer may be configured to confine lithium sulfide. Further, each sublayer may include groupings and/or portions where each groupings and/or portions may be configured specifically for Li ion conduit, rapid Li ion transport, and/or to confine lithium sulfide. In another embodiment, polysulfides may be filtered in higher concentrations within each sublayer as the layers stack up closer to the separator. In the context of the sublayers (306*a* through 306*d*), there may be no limit to the number of applied sublayers comprising the second cast layer 306.

In another embodiment, each of the porous structures of the sublayers 306*a* through 306*d* may comprise a set of agglomerates and the agglomerates may include interstitial spacing of varying dimension (for each of the sublayers). Each sublayer therefore may have specific and preconfigured conditions to perform predetermined agglomerates, and resulting interstitial spacing.

Additionally, in various embodiments, agglomerates may form through various mechanisms. By way of non-limiting example, electrostatic forces between very small (nanoscale) particles may bring about the agglomeration of two or more disparate particles. In addition, formation of solid bridges between particles may form upon evaporation following spraying of an additional liquid. Further still, thermal effects may bring about agglomeration through, for example, sintering or glass transition. It is to be appreciated that the agglomerates may form as well based on the spray-drying technique, the solvent used in the application, etc.

Figure 4:
FIG. 4 illustrates a tri-layer electrode structure, in accordance with one embodiment.
Figure 4:
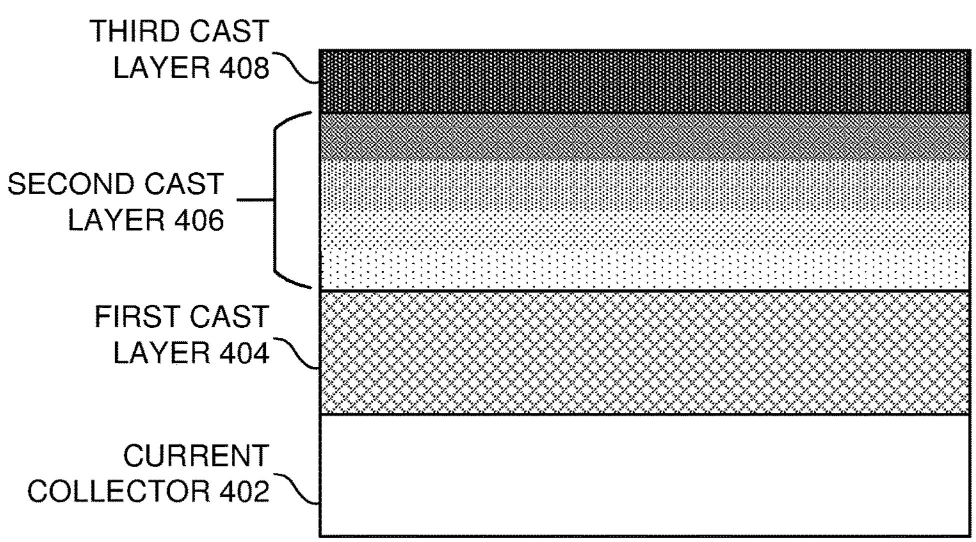

FIG. 4 illustrates a tri-layer electrode structure 400, in accordance with one embodiment. As an option, the tri-layer electrode structure 400 may be implemented in the context of any one or more of the embodiments set forth in any previous and/or subsequent figure(s) and/or description thereof. Of course, however, the tri-layer electrode structure 400 may be implemented in the context of any desired environment. Further, the aforementioned definitions may equally apply to the description below.

As shown, the tri-layer electrode structure 400 may be comprised of a current collector 402, a first cast layer 404 (in direct contact with the current collector 402), a second cast layer 406 applied over the first cast layer 404, and a third cast layer 408 applied over the second cast layer 406.

Consistent with the disclosure herein, the second cast layer 406 may be constructed and configured in a manner similar to the second cast layer 306. In one embodiment, the third cast layer 408 may include a third plurality of carbon aggregates having a third porosity. This third porosity may differ (and in some instances be less than) the porosity of the second cast layer 406 having a second porosity. Alternatively, the third porosity may be greater than the second porosity. In addition, the second porosity may be characterized by a continuous gradient from the first porous structure to the second porous structure (consistent with the discussion of the second cast layer 306 and the concentration gradient 208). It should be appreciated that greater porosity may yield greater throughput and increased ability for lithium ions to pass (more-or-less unhindered) through a given sublayer of the second cast layer.

Additionally, although not shown, the third cast layer 408 may be configured to have gradient (or varying concentration) sublayers as well, consistent with that shown with respect to the second cast layer 306.

In another embodiment, the third cast layer 408 may act as a buffer layer that minimizes interface growth or dendrite growth. For example, in one particular embodiment, the third layer may be a polyvinylidene fluoride (PVDF) and/or a polyethylene oxide material used in the production of composite electrodes to form an essentially non-permeable (or solid) membrane designed to help prevent the electrolyte from reacting with the surface of the lithium in the electrode. In addition, the PVDF material may be designed without any inherent porosity so that it may allow free transfer of lithium ions and may thus act as a type of capacitor (e.g., with minimized impedance) for the electrode in question. Further, the PVDF material may be prepared as a solution of one to two percent PVDF mixed with a lithium storage material like silicon, tin, and/or graphite. Further still, a conductive additive like carbon fibers, alumina, and/or lanthanum zirconium oxide may also be added to the PVDF material solution. Further still, the PVDF material layer may be applied in a thickness of approximately 10 microns in depth. Alternatively, the PVDF material layer may be applied to fit design specifications requiring fewer than or greater than 10 microns.

Figure 5:
FIG. 5 illustrates rows within a second cast layer of a dual-layer electrode structure, in accordance with one embodiment.
Figure 5:
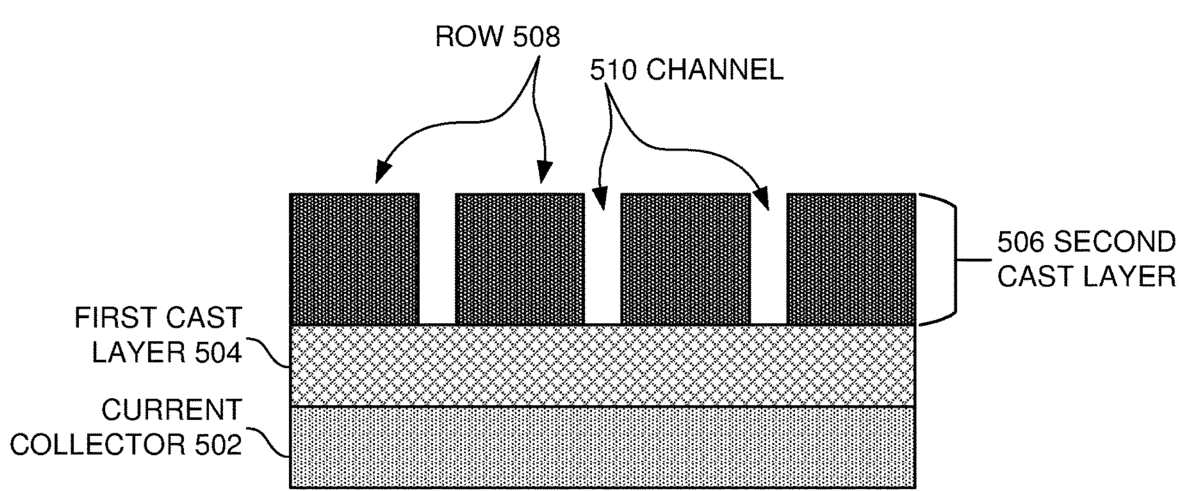

FIG. 5 illustrates rows within a second cast layer of a dual-layer electrode structure 500, in accordance with one embodiment. As an option, the dual-layer electrode structure 500 may be implemented in the context of any one or more of the embodiments set forth in any previous and/or subsequent figure(s) and/or description thereof. Of course, however, the dual-layer electrode structure 500 may be implemented in the context of any desired environment. Further, the aforementioned definitions may equally apply to the description below.

As shown, the dual-layer electrode structure 500 may be comprised of a current collector 502, a first cast layer 504 (in direct contact with the current collector 502), and a second cast layer 506 applied over the first cast layer 504. In addition, the second cast layer 506 may be deposited as a series of rows 508 onto the first cast layer 504, with a channel 510 between each of the rows 508.

In one embodiment, channels 510 between each of the rows 508 may allow for lithium ion penetration across each surface of the row of the second cast layer 506. In one embodiment, the channels 510 between each of the row 508 may be created by etching the second cast layer 506 to expose a subset of the first cast layer 504. It is to be appreciated that other techniques (other than etching) may be applied as appropriate to create the rows 508. Additionally, a laser may be employed to effectively etch channels into one or more sublayers of second cast layer 506. In another embodiment, the rows 508 may be configured to allow for differing shape, width, and/or depth, depending upon particular design specifications (which may provide for greater surface area contact and increased capacitance within the electrolyte). Further, although not explicitly shown within the context of the dual-layer electrode structure 500, it is to be appreciated that the second cast layer 506 may include a concentration gradient (such as the concentration gradient 208) as disclosed herein.

It is to be appreciated that that the series of rows 508 may be substantially parallel (one row to the next), and may specifically designed as desired (diagonally aligned, perpendicular to a principal axis, etc.).

In addition, additional layers (not shown) may be applied above the second cast layer 506, where each of those additional layers may (or may not) also etch out rows. For example, a third cast layer (such as the third cast layer 408) may be layered on top of the second cast layer 506 and may serve as an initial barrier. The rows 508 of the second cast layer 506 may therefore be configured to maximize transport pathways and surface area for ion absorption. Further, including the channels 510 in various sublayers of the second cast layer 506 may bring about the result of providing diffusion pathways within the electrode layers to facilitate and maximize lithium ion traversal.

Figure 6:
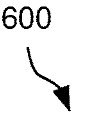
FIG. 6 illustrates a method for creating a dual-layer electrode structure, in accordance with one embodiment.
Figure 6:
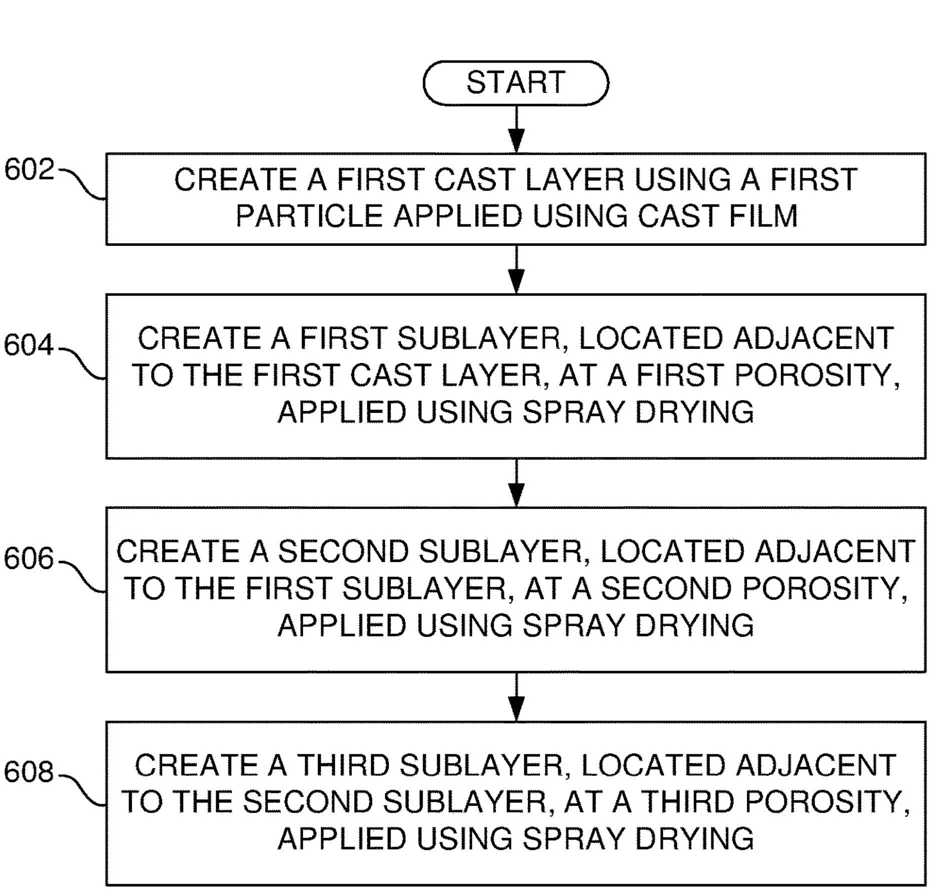

FIG. 6 illustrates a method 600 for creating a dual-layer electrode structure, in accordance with one embodiment.

As shown, a first cast layer is created, using a first particle, applied using cast film. See operation 602. In one embodiment, the first layer may have a thickness between 10 microns and 200 microns. As discussed herein, the first particle may be configured prior to be applied.

Additionally, a first sublayer, located on top of the first cast layer, may be created at a first porosity by applying spray drying. See operation 604. In addition, a second sublayer, located on top of the first sublayer, may be created at a second porosity by applying spray drying. See operation 606. Further, a third sublayer, located on top of the second sublayer, may be created at a third porosity by applying spray drying. See operation 608. In one embodiment, the first sublayer, the second sublayer, and/or the third sublayer may comprise a second cast layer, layered on top of the first cast layer.

In one embodiment, spray drying may incorporate depositing particles to create a secondary pore structure. Additionally, the pores created within structure may form agglomerates comprising interstitial spaces between particles. In addition, the secondary pore structure may be comprised of carbon nano-onion (CNO) to form a primary pore structure. Further, spray drying may incorporate the practice of employing different types of particles with different size channels. Further still, the difference size channels may be manifested as different channel densities and/or different porosity measures. By way of example, the process of spray drying particles may actually modify fundamental secondary particles so as to further promote a hierarchical sublayer structure.

In one embodiment, the spray-dryer may be employed to create a gradient multi-sublayer structure comprised of different types of particles in the different sublayers. By way of example, multiple sublayers of different types of particles may be deposited through particle manipulation, sublayer-upon-sublayer, to construct different gradient porosity and/or density structures. It should be appreciated that the same types of particles may also be used in different sublayers, in one or more different porosities and/or densities, to achieve a gradient concentration result. In addition, different particles may be applied by spray drying in any combination to achieve desired porosity and/or density thresholds.

In one embodiment, the particles applied in the gradient sublayers via spray drying may be comprised of, but may not be limited to, varying states of carbon particles, tungsten sulfide, tungsten oxide, magnesium oxide, lithium lanthanum, and/or zirconium oxide. Additionally, different percentage weights or concentrations of tungsten sulfide, tungsten oxide, magnesium oxide, lithium lanthanum, and/or zirconium oxide may be applied via spray drying. By way of just one non-exhaustive example, the tungsten sulfide and/or tungsten oxide may be applied in a model wherein a top sublayer may yield a 10% concentration while the bottom sublayer may yield a 1% concentration. It should be appreciated that concentrations cascading from lowest-to-highest may be just as desirable as concentrations cascading from highest-to-lowest, depending on the specific application for a specific electrode layer. In one example, the highest-concentration sublayer may be most desirable in closest proximity to the battery separator (such as the separator 104) positioned between the anode and cathode. In addition, the sublayer of the electrolyte compound may be employed in liquid, gelatinous, or solid form, or a combination thereof.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An electrode of a lithium-based battery, the electrode comprising:

a first layer in direct contact with an electrically conductive substrate, the first layer including active materials in a primary particle state and a first plurality of carbon aggregates having a first porosity; and a second layer situated, at least in part, proximal to the first layer, the second layer having a second porosity and including active materials in a secondary aggregate form and a second plurality of carbon aggregates comprising agglomerates with interstitial spaces between particles;

wherein the second plurality of carbon aggregates have been processed into a secondary aggregate where the porosity has been tuned to form the agglomerates with the interstitial spaces between particles;

wherein the second plurality of carbon aggregates includes a first group of aggregates and a second group of aggregates;

wherein the first layer is characterized by a first property to maximize ion density, and the second layer is characterized by a second property to maximize percolation channels, and wherein the second layer is thicker than the first layer and has increased interparticle porosity relative to the first layer; and wherein the first group of aggregates is characterized by a first porous structure, and the second group of aggregates is characterized by a second porous structure, the second porous structure having a greater pore interconnectivity than the first porous structure.

2. The electrode of claim 1, wherein the first group is characterized by a first conductivity, the second group is characterized by a second conductivity, and the second conductivity is greater than the first conductivity.

3. The electrode of claim 1, wherein first layer has a concentration of carbon aggregates that is different from a concentration of carbon aggregates in the second layer.

4. The electrode of claim 1, wherein the first layer has a concentration of carbon aggregates that is greater than a concentration of carbon aggregates in the second layer.

5. The electrode of claim 1, wherein the first layer has a thickness between 10 microns and 200 microns.

6. The electrode of claim 1, wherein the second layer entirely covers at least one surface of the first layer.

7. The electrode of claim 1, wherein the second layer is constructed as a series of rows, each row of the series of rows covering a portion of the first layer.

8. The electrode of claim 1, further comprising a third layer above, at least in part, the second layer, the third layer including a third plurality of carbon aggregates having a third porosity, and wherein the third porosity is less than the second porosity.

9. The electrode of claim 1, wherein the first porous structure includes a first plurality of interconnected channels, wherein the second porous structure includes a second plurality of interconnected channels, and wherein the first plurality of interconnected channels and the second plurality of interconnected channels are coupled to one another.

10. The electrode of claim 9, wherein the first porous structure and/or the second porous structure each includes a first portion configured to provide a Li ion conduit, a second portion configured to facilitate rapid Li ion transport, and a third portion configured to confine lithium sulfide.

11. The electrode of claim 1, wherein the electrode is an anode.

12. The electrode of claim 1, wherein the electrode is a cathode.

13. The electrode of claim 1, wherein the first layer has a structure configured to maximize ion density, and the second layer has a structure configured to maximize percolation channels, wherein the first layer has a higher concentration of carbon aggregates and lower porosity than the second layer.

14. The electrode of claim 1, wherein the second porosity is characterized by a continuous gradient from the first porous structure to the second porous structure.

15. The electrode of claim 1, wherein the second layer has a structure defined by a series of rows onto the first layer, each row of the series of rows configured to allow for ion penetration across each surface of the row.

16. The electrode of claim 1, wherein the first porous structure comprises a first set of agglomerates, the first set of agglomerates being characterized by interstitial spacing of a first dimension.

17. The electrode of claim 1, wherein the second porous structure comprises a second set of agglomerates, the second set of agglomerates being characterized by interstitial spacing of a second dimension.

18. The electrode of claim 1, wherein the second layer comprises a hierarchal layering based on the first porous structure, the second porous structure, the second porosity, and interstitial spacing.

19. The electrode of claim 18, wherein the interstitial spacing is spacing between the first porous structure and the second porous structure, and is based, at least in part, on a solvent used to create one or both of the first porous structure and the second porous structure.

20. The electrode of claim 1, comprising a third layer above, at least in part, the second layer, the third layer including a third plurality of carbon aggregates, wherein the third layer is a buffer layer that minimizes interface growth and/or dendrite growth.

21. The electrode of claim 1, wherein the first plurality of carbon aggregates are in a as-deposited arrangement, and the second plurality of carbon aggregates form agglomerates comprising interstitial spaces between particles.

22. The electrode of claim 1, wherein the first layer is characterized by a property to maximize ion density and the second layer is characterized by a property to maximize percolation channels.

* * * * *